April 16, 1968 E. MEYER ET AL 3,378,681

TRAVELING LAMP CONSTRUCTION

Filed Oct. 23, 1965

INVENTORS
ELLIOTT MEYER
MARVIN COOPER

BY Percy Freeman

ATTORNEY 3,378,681
Patented Apr. 16, 1968

3,378,681

TRAVELING LAMP CONSTRUCTION

Elliott Meyer, New York, and Marvin Cooper, New Rochelle, N.Y., assignors to Dynamic Classics Ltd., New York, N.Y., a corporation of New York Filed Oct. 23, 1965, Ser. No. 502,968
5 Claims. (Cl. 240—8.18)

ABSTRACT OF THE DISCLOSURE

A lamp construction employing a gooseneck-type socket support and a spool-wound electric supply cord, all of which are quickly and easily removable from a single, extremely small container for use, and returnable to the container for storage.

This invention relates generally to lamps, and is particularly concerned with a unique construction of lamp, as for use in traveling, and the like.

While the lamp of the present invention has been primarily developed and employed for use in automobile traveling, and will be illustrated and described hereinafter with particular reference thereto, it is appreciated that the advantageous features of the instant invention are capable of many varied applications, all of which are intended to be comprehended herein.

As is well known to those versed in automotive travel, there are many occasions requiring the use of a convenient, portable, high-intensity source of illumination, not readily available to the traveler, as for making repairs, studying road maps, waving down a passing vehicle, a passenger reading without disturbing the driver, and others.

Accordingly, it is an important object of the present invention to provide a lamp construction which overcomes the above-mentioned difficulties, is advantageously well suited for use as a utility light, work light, spotlight, flashlight, signal light, map study or reading either in the front or back seat of an automobile, and wherein portability is uniquely provided by means of quick and easy collapse of the entire lamp into an extremely small compact and attractive luggage-type case adapted to be readily stowed away in the glove compartment of a car.

It is a more particular object of the present invention to provide a unique and highly advantageous lamp construction employing a gooseneck-type socket support and spool-wound electric-supply cord, all of which are quickly and easily removable from a single, extremely small container for use, and returnable to the container for storage.

It is still a further object of the present invention to provide a lamp construction having the advantageous characteristics mentioned in the preceding paragraphs, which is extremely simple in structure, durable and reliable throughout a long useful life, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figures 1, 2, 3, 4:
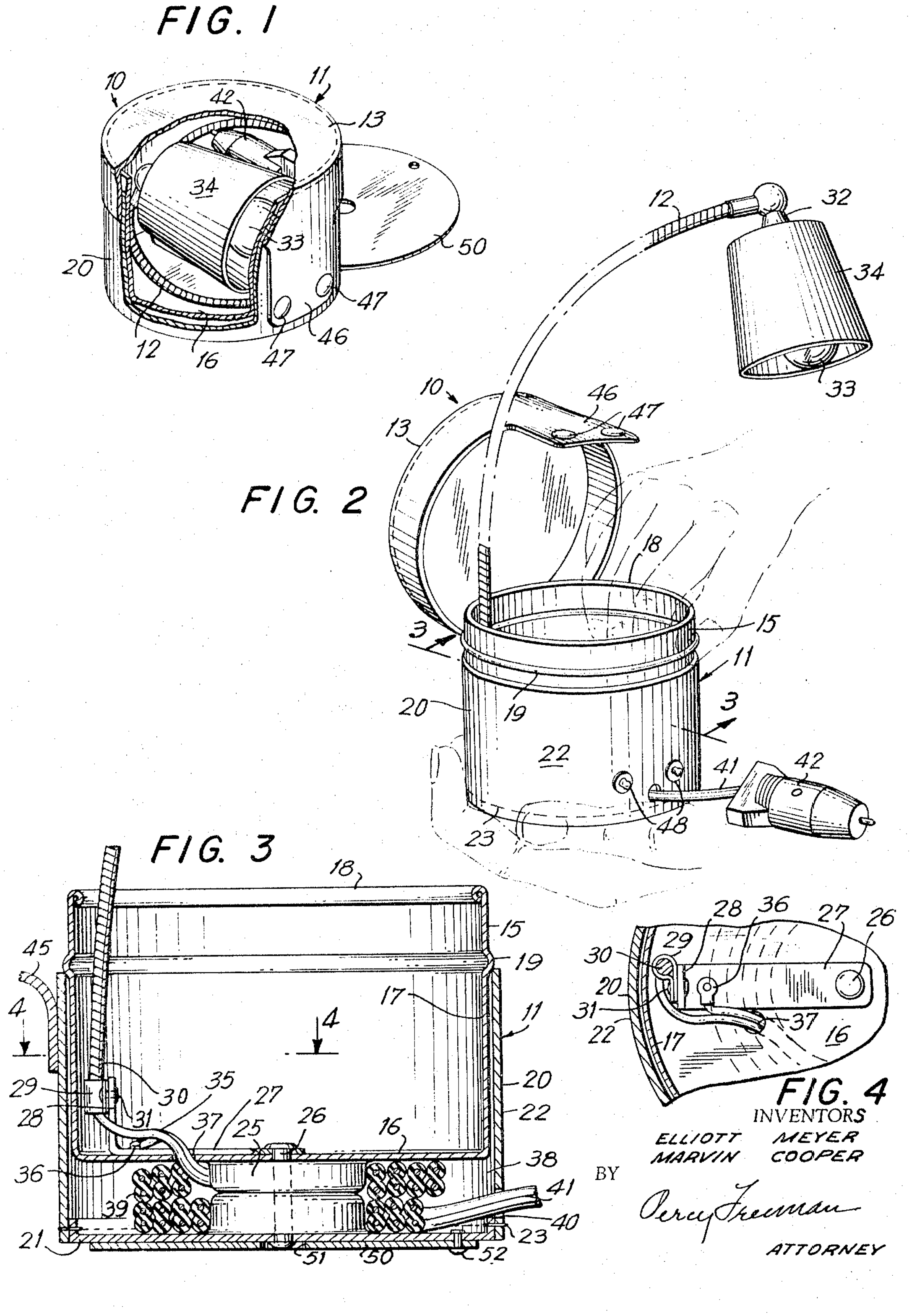
FIGURE 1 is a top perspective view showing a lamp construction of the present invention, partly broken away for clarity of understanding.
FIGURE 2 is a top perspective view showing the lamp construction of FIGURE 1 being opened for use.
FIGURE 3 is a sectional elevational view taken generally along the line 3—3 of FIGURE 2.
FIGURE 4 is a fragmentary sectional view taken generally along the line 4—4 of FIGURE 3.

Referring now more particularly to the drawings, and specifically to FIGURES 1 and 2 thereof, the lamp construction of the present invention is there generally designated 10, and includes a generally cylindrical case 11 having stored interiorly thereof a gooseneck or bendable, self-supporting elongate conduit 12. In FIGURE 2, the case 11 is shown with its cover 13 open and the conduit 12 extending from the case.

More specifically, the case 11 includes a generally cylindrical, cup-shaped inner receptacle or container 15, which may be formed of metal, or other suitable material. The inner receptacle 15 may include a generally circular, flat bottom wall 16 and a generally cylindrical side wall 17 upstanding from and extending peripherally about the bottom wall. The upper edge of the side wall 17 may be curled to form a bead 18, and a circumferential, external rib 19 may be rolled, or otherwise formed in the wall 17 adjacent to and spaced below the bead 18.

Conformably receiving the generally cylindrical, cup-shaped inner receptacle or container 15 is a generally cylindrical, cup-shaped outer receptacle or container 20. The outer container 20 may advantageously be fabricated of leather, or other suitable material, and may include a generally flat, substantially circular bottom wall 21 arranged axially of and spaced below the inner receptacle bottom wall 16. A peripheral side wall 22 extends about and upstands from the bottom wall 21, being secured thereto by any suitable means, such as stitching 23. The side wall 22 upstands preferably to a point adjacent to and just below the circumferential formation or rib 19, having its open upper end spaced below the open upper end of the inner container 15.

A generally cylindrical member or spool 25 is interposed between the spaced inner and outer receptacle bottom walls 16 and 21, coaxially therewith, and may be fixed to the inner receptacle bottom wall 16, as by a rivet 26 extending axially through the spool and both the receptacle bottom walls 16 and 21. The rivet 26 may serve as pivot means to mount the outer receptacle 20 for axial rotation relative to the inner receptacle 15 and spool 25.

Interiorly of the inner container 15 is secured a bracket 27, having one arm flat on the bottom wall 16 and fixed at its distal end to the rivet 26, while its other arm 28 upstands from the bottom wall 16 adjacent to the side wall 17. The upstanding bracket arm 28 may carry a connector or strap firmly embracing the inner end 30 of conduit 12 and pivotally connected to the arm 28, as by pin or rivet 31.

The conduit 12 may be of the bendable, tubular, spirally wound type, commonly called "gooseneck," and is provided on its opposite end with a lamp socket 32 carrying a lamp 33 and shade 34. In the extended condition of conduit 12, as shown in FIGURES 2–4, the conduit may be swung to any desired angular relation about the axis of rivet 31, in addition to bending of the form-retaining conduit by manipulation thereof. Further, the conduit 12 may be coiled for collapse and insertion of the conduit together with the socket 32, lamp 33 and shade 34 in the inner receptacle 15, as seen in FIGURE 1.

An electric-supply cord 35 may extend through the conduit 12, from connection with the socket 32 and exiting from the conduit at the inner end 30 into the lower region of inner receptacle 15. In a D.C. electrical system, the cord 35 may include a grounded conductor 36, as by connection to the bracket 27. From the interior of inner receptacle 15, the cord 35 may pass downward through a hole 37 in the inner receptacle bottom wall 16 to the space 38 between the bottom receptacle walls 16 and 21 and surrounding the spool 25. In the space 38 the cord may wind about the spool 25, as at 39, and thence extend outward, as through a hole 40 in a lower region of outer receptacle side wall 22. Thus, the cord extends externally of the case 11, as at 41, where it may be provided with a suitable plug 42 or other connector for engagement with a source of electrical supply.

In order to close the case 11, the lid or cover 13 may be provided with a flexible extension 45 connected to the side wall 22 and defining a hinged connection therewith. Extending from the opposite side of lid 13 is a flap 46 engageable downward over the side wall 22 of outer receptacle 20 and having fastener elements 47 complementary to fastener elements 48 carried by the outer receptacle side wall on opposite sides of the opening 40. Thus, the cover 13 is removably securable in closing relation by interengagement of the fasteners 47 and 48.

An additional, generally flat member or plate 50 may be provided in facing engagement with the undersurface of outer receptacle bottom wall 21, having a central hole 51 for snap reception of the exposed lower end of rivet 26. The member 50 is pivoted, as at a marginal region by pivot 52 to the bottom wall 21 and swingable from its inoperative position concentric with and entirely beneath the latter bottom wall to an operative position extending radially outward from the bottom wall, as in FIGURE 1. The plate member 50 provides a convenient means for mounting the instant lamp in many circumstances, as by insertion of the plate member in the window slot of a vehicle door, or otherwise.

In addition to extension and retraction of the conduit 12 and its associated elements, the cord and connector 42 and adjacent cord portion 41 may be slidably extended through the outer receptacle side wall hole 40, as by relative rotation between the inner and outer receptacles 15 and 20 to unwind the cord from the spool 25. Conversely, the cord may be rewound on the spool by relative rotation in the opposite direction. While the electrical connector 42 is of the type employed for insertion into a lighter socket of a vehicle, other suitable electrical connectors could be employed. In the fully closed condition, as for storage, the electrical connector 42 may be inserted downward through the open upper end of the inner receptacle 15, as seen in FIGURE 1, the cord 41 lying beneath the flap 46 and being completely concealed thereby.

From the foregoing, it is seen that the present invention provides a lamp construction which is well adapted to meet practical conditions of manufacture and use, and otherwise fully accomplishes its intended objects.

Although the present invention has been described in some detail by way of illustration and example for purposes of clarity of understanding, it is understood that certain changes and modifications may be made within the spirit of the invention and scope of the appended claims.

What is claimed is:

1. A lamp construction comprising a receptacle having an open side, a bendable form-retaining conduit having one end extending through said open side into said receptacle, mounting means mounting said one end of said conduit interiorly of said receptacle, and a lamp socket on the other end of said conduit exteriorly of said receptacle, said lamp socket and conduit being removably engageable in said receptacle upon bending of said conduit, said receptacle comprising an outer container, an inner container within said outer container and rotatable relative thereto, a spool carried by said inner container externally thereof coaxial with the axis of rotation and within said outer container, and elongate flexible conduit means having one end connected to said lamp socket and extending therefrom through said conduit and about said spool, said outer container having a hole in one wall opening toward said spool, and the other end of said conductor means extending slidably outward through said hole, whereby said conductor means is windable and unwindable relative to said spool upon relative rotation of said containers.

2. A lamp construction comprising a generally cylindrical cup-shaped inner receptacle having a closed bottom and an open top, a bendable form-retaining conduit, mounting means mounting one end of said conduit in said inner receptacle, a lamp socket on the other end of said conduit and movable with the latter for collapse into said inner receptacle and extension therefrom, a spool coaxially on the bottom of said inner receptacle externally thereof, a generally cylindrical cup-shaped outer receptacle having a closed bottom and an open top and rotatably receiving said spool and inner receptacle, and an electric cord extending from said one end of said conduit through the bottom of said inner receptacle about said spool and slidably through a wall of said outer receptacle, whereby said electric cord is adapted to be wound and unwound relative to said spool for retraction and extension through said outer receptacle wall upon relative rotation of said inner and outer receptacles.

3. A lamp construction according to claim 2, in combination with a closure removably engageable in closing relation with said inner and outer receptacles.

4. A lamp construction according to claim 2, said mounting means comprising a connector connected to said one conduit end and adjustably pivoted to said inner receptacle, for selective adjustment of said conduit.

5. A lamp construction according to claim 2, in combination with a base extension member pivoted to the underside of said outer receptacle for swinging movement relative thereto between an inoperative position entirely beneath said outer receptacle and an operative position extending beyond said outer receptacle.

References Cited

UNITED STATES PATENTS

| | | | |
|---|---|---|---|
| 2,508,071 | 5/1950 | Martin et al. ---- | 240—8.18 XR |
| 2,965,747 | 12/1960 | Secofsky --------- | 240—36 XR |
| 3,322,944 | 5/1967 | Mellyn ------------ | 240—8.18 |

NORTON ANSHER, *Primary Examiner.*